United States Patent [19]
Wielt et al.

[11] 3,940,648
[45] Feb. 24, 1976

[54] LAMINATED CORE AND SUPPORT ASSEMBLY FOR A DYNAMOELECTRIC MACHINE

[75] Inventors: Warren Pierce Wielt; Luis Alberto Estrada, both of Schenectady, N.Y.

[73] Assignee: General Electric Company, Schenectady, N.Y.

[22] Filed: Sept. 5, 1974

[21] Appl. No.: 503,269

[52] U.S. Cl. .............................................. 310/217
[51] Int. Cl.² ........................................ H02K 1/06
[58] Field of Search .......... 310/217, 254, 216, 259, 310/258, 260, 42, 65, 51, 89, 91, 66, 42; 29/605; 336/210; 403/252, 261

[56] References Cited
UNITED STATES PATENTS

| | | | |
|---|---|---|---|
| 1,689,503 | 10/1928 | Savage | 310/217 |
| 1,873,989 | 8/1932 | Williamson | 310/217 |
| 1,936,744 | 11/1933 | Adams | 310/258 |
| 2,769,933 | 11/1956 | Ballman | 310/217 |
| 2,818,515 | 12/1957 | Dolenc | 310/217 |
| 3,463,955 | 8/1969 | Scardina | 310/217 |
| 3,512,024 | 5/1970 | Papa | 310/259 |

*Primary Examiner*—R. Skudy
*Attorney, Agent, or Firm*—Vale P. Myles

[57] ABSTRACT

A stack of stator core laminations are compressed between a pair of resilient end flanges that are flexed into a dished configuration and secured in a pre-determined spaced-apart relationship by being welded to a plurality of longitudinal ribs disposed around the periphery of the stator laminations. Special tools and welding techniques are used during the manufacture of the core assembly to cause the dished flanges to continuously apply a pre-determined compressive force to the stacked laminations after the core assembly is completed.

6 Claims, 3 Drawing Figures

U.S. Patent  Feb. 24, 1976  3,940,648
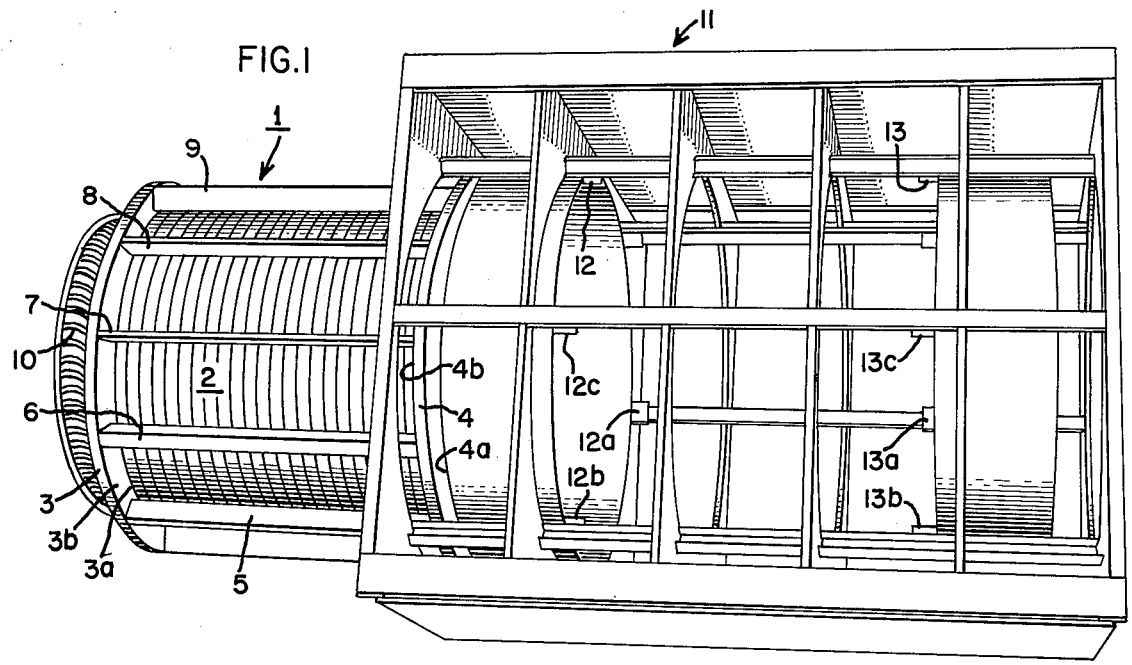
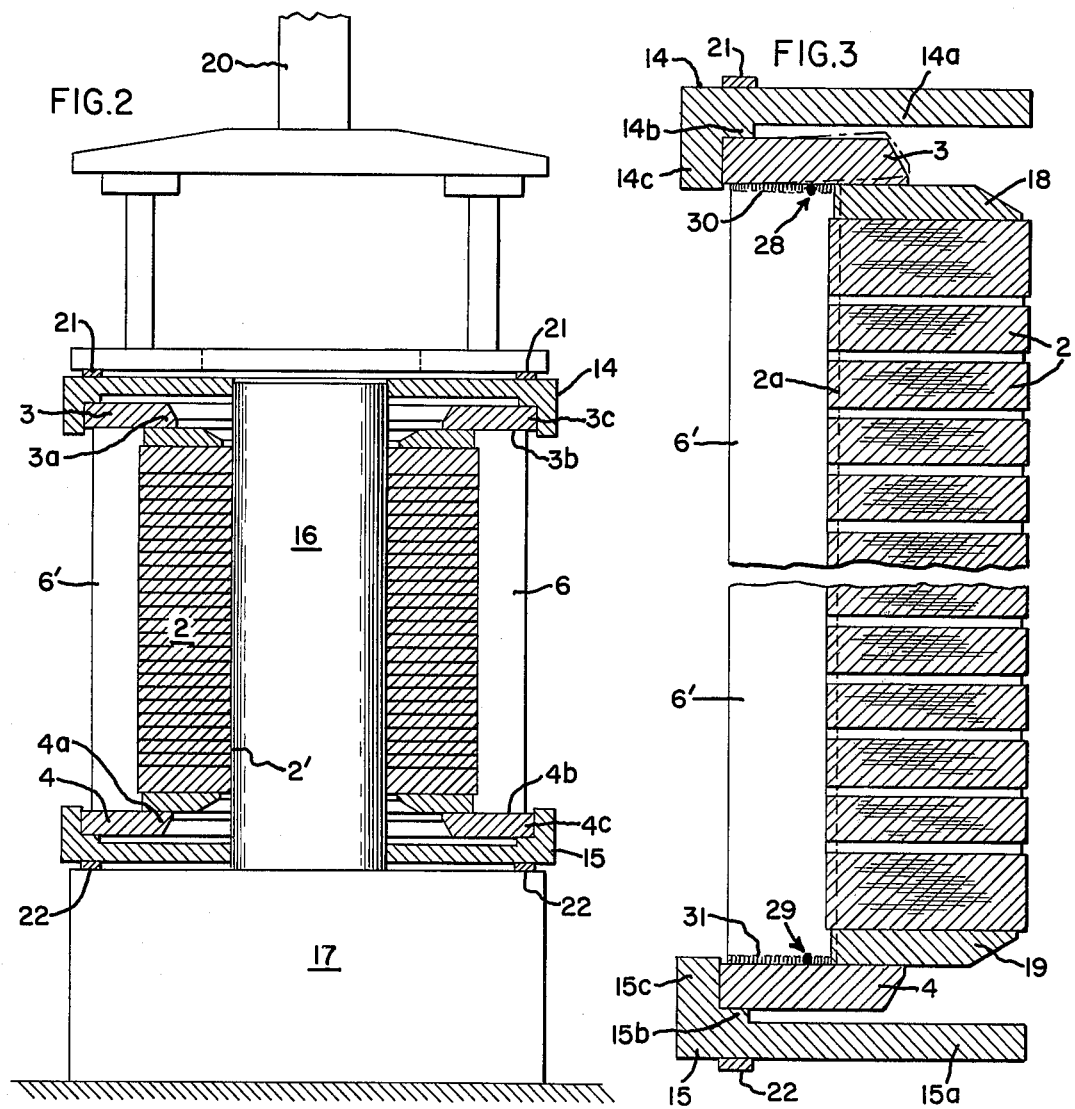

LAMINATED CORE AND SUPPORT ASSEMBLY FOR A DYNAMOELECTRIC MACHINE

BACKGROUND OF THE INVENTION

In the manufacture of dynamoelectric machines having laminated stator cores, it is desirable to retain the laminations in their stacked position under a pre-determined optimum compressive pressure. Such optimum pressure must be sufficiently great to prevent vibration of the laminations during operation of the machine, because such vibration could cause metal fatigue and eventual failure, as well as resulting in undesirable noise and possible chafing of the insulation on the energizing coils wound in the stator slots. On the other hand, the compressive pressure should not be such that excessive variations occur in core length and produce loss of needed magnetic material. Obtaining an optimum degree of compression of a laminated stator core is complicated by the fact that the stator laminations frequently vary slightly in thickness and the varnish coatings used to insulate the laminations frequently are of relatively uneven thickness. Normally, such variations in thickness on the individual laminations and in the varnish coating are relatively small but the cumulative effect of these variations in a complete stack of laminations needed for large dynamoelectric machine stators can cause a significant variation in stator lengths if appropriate control of the compressive pressures applied to the stator during manufacture is not maintained.

A wide variety of manufacturing methods and associated stator laminations clamping assemblies have been developed over the years. In general, such prior art methods and structures can be divided into two broad categories, i.e., those used to manufacture relatively large dynamoelectric machines that require several tons of pressure to be applied in obtaining a desired compressive force on the stacked stator laminations, and those used to assemble smaller dynamoelectric machines that require a much lower compressive force to be applied in assembling the stacked laminations. Generally speaking, in the manufacture of the larger type of dynamoelectric machines it is common practice to secure the stator laminations between a pair of clamping flanges positioned at opposite ends of the stacked laminations. At the present time, some variations of one of three well-known stator assembling methods is almost always used to retain a desired compressive force on the laminations of such large stator assemblies. In perhaps the most widely used of these known prior art methods, a stator-supporting frame is machined over its entire length so that it engages the periphery of each of the stator laminations at several circumferentially spaced points. Then, the frame is heated to expand it sufficiently to receive therein the compressed stator laminations. As the frame cools, it shrinks around the laminations and secure them tightly in their compressed position. A second commonly used stator core clamping method employs a so-called "clam shell" clamping structure. Basically, the clam shell type of clamping assembly utilizes a plurality of threaded bolts positioned at arcuately spaced-apart points around the circumference of stator lamination clamping flanges to enable the flanges to be forced toward one another as the bolts are tightened. An early example of one form of such a stator clamping structure is shown in U.S. Pat. No. 1,685,054-Hibbard which issued on Sept. 18, 1928. The third stator core lamination clamping means now in common use typically incorporates one or more wedges or keys mounted between the stator clamping flanges and the frame of a dynamoelectric machine to enable the compressive force applied through the flanges to the stacked laminations to be adjusted by relative movement of the wedges causing them to apply more or less force to the flanges, until a desired compressive force is attained.

All of the foregoing presently known prior art methods and structures for securing the stator laminations of large dynamoelectric machines under a desired predetermined compressive force have certain features in common. In each of them, for example, lamination clamping means are used which apply a relatively static clamping force to the stack of laminations, rather than utilizing resiliently pre-stressed clamping means to obtain such a clamping force. The use of such static clamping methods results in a second characteristic feature inherent in each of the above-described prior art stator assembly structures. Specifically, each of these structures must be relatively massive to accommodate the high compressive forces that must be applied to a stack of laminations during initial assembly of the machine in order to allow the static-type clamping means to retain a desirable level of compressive force on the laminations after they have been released from a positioning press and are then held in position only by the clamping means. It has long been recognized that such massive structures have certain disadvantages, such as their inherent cost and the inconvenience and expense encountered in transporting them. However, prior to the present invention, these prior art methods appeared to be the most suitable for commercial manufacture of dynamoelectric machines.

In addition to the general types of stator lamination clamping means described above for use in the manufacture of stators for large dynamoelectric machines, several types of resilient stator lamination mounting means are known for application in the manufacture of smaller machines. Normally, such resiliently pre-stressed stator lamination clamping means are used primarily as an efficient means for quickly securing a stack of laminations in a desired position on a shaft, rather than being designed primarily to apply any appreciable compressive force to the stacked laminations. Examples of such low pressure securing or locking means for securing small stator laminations on a shaft are shown in U.S. Pat. No. 1,192,404-Ewart, which issued on July 25, 1916 and in U.S. Pat. No. 1,467,938-Janette, which issued on Sept. 11, 1923. Because the assembly methods and structures shown in these two patents are not capable of applying a high compressive pressure to the stacked laminations, they are not suitable for applying a compressive pressure of several tons that is needed in the manufacture of stator lamination assemblies for larger machines.

Another type of stator clamping means that is suitable for small and medium size machines in shown in U.S. Pat. No. 2,876,371-Wesolowski, which issued on Mar. 3, 1959 and is assigned to the assignee of the present invention. A form of resilient clamping means are employed in the Wesolowski arrangement to secure lamination clamping rings under a desired pre-determined clamping pressure. However, the resilient clamping means used comprise a plurality of pins, the respective ends of which are welded to the lamination clamping rings when the stack of laminations is held under a compressive force. The length of the pins is pre-determined so that when the compressive force on the stack of laminations is released, the pins are stretched beyond their elastic limit by the expansion of the laminations. The stated purpose of such stretching of the pins is to stabilize the compressive force that they apply to the clamping rings. In certain respects, the Wesolowski clamping arrangement is similar to the relatively static type of clamping means described above in that the ring-securing pin must be sufficiently massive, or a large number of pins must be used, so that the high compressive force needed to yield a desired retained force of compression after the pins are stretched is afforded. Moreover, the structure and method disclosed in the Wesolowski patent is not suitable for use with very large stator core assemblies in which several tons of compressive pressure is needed to attain an optimum balance between core flux carrying capacity and core flux losses.

Accordingly, it is a primary object of the present invention to provide a dynamoelectric machine core assembly and method for making such an assembly, which overcome the disadvantages inherent in known prior art methods and structures for compressively clamping laminated core structures for large dynamoelectric machines.

Another object of the invention is to provide a laminated core clamping assembly and method of manufacture that affords an optimum pre-determined retained compressive force in a stack of laminations following the final assembly of such a stack.

A further object of the invention is to provide a dynamoelectric machine core assembly for large dynamoelectric machines, that are less costly to manufacture and lighter in assembled weight than prior art machines having equivalent retained compressive force in their cores.

Still another object of the invention is to provide a method of manufacturing a laminated core assembly that enables a desirably high pre-determined compressive force to be maintained in the finished assembly while permitting the use of relatively low lamination compressing forces during the manufacturing processes.

Yet another object of the invention is to provide a dynamoelectric machine core assembly having an optimum retained compressive force in its laminated core stack while utilizing relatively small and lightweight structural assemblies for maintaining the core pressure on the laminated core stack, after it is removed from a core-compressing press.

Additional objects and advantages of the invention will become apparent to those skilled in the art from the description of it that follows below, taken in conjunction with the illustrations attached hereto.

SUMMARY OF THE INVENTION

In one preferred embodiment of the invention, a dynamoelectric machine core assembly comprising an aligned stack of stator laminations compressed between a pair of clamping flange annuli is manufactured pursuant to the present invention so that the annuli are dished or resiliently pre-stressed axially outward at their inner diameters while the stack of laminations is held under a pre-determined compressive force by a press during a manufacturing operation. The annuli are then welded, respectively, to opposite ends of a plurality of steel ribs mounted partially in slots formed axially along the peripheral surfaces of the stacked laminations. The welds are each made in a sequence and direction such that the resilient pre-stressing of the clamping annuli is optimized. In practicing the preferred method of the invention, a pair of stepped pressure rings are used to accurately position the clamping annuli with respect to the inner diameter of the stack of laminations. Thus, the assembly of the core into a mounting frame is facilitated because only the surfaces of the peripheries of the clamping annuli need be machined relative to associated mounting surfaces of the frame in order to accurately and firmly mount the core assembly within the frame.

BRIEF DESCRIPTION OF THE DRAWINGS

FIG. 1 is a partially exploded, side perspective view of a dynamoelectric machine core assembly and mounting frame manufactured pursuant to the teaching of the present invention.

FIG. 2 is a side elevation view, partly in cross-section, showing a core assembly such as that illustrated in FIG. 1, mounted in position on a press that is positioned to apply a compressive force to the laminations of the core assembly, using a pair of stepped pressure rings pursuant to the method of the instant invention.

FIG. 3 is an enlarged fragmentary side elevation view, in cross-section of one side of the laminated core assembly illustrated in FIG. 2 of the drawings, shown in relation to the stepped pressure rings used to compress the core.

DESCRIPTION OF PREFERRED EMBODIMENTS OF THE INVENTION

Referring now to FIG. 1 of the drawings, it will be seen that there is shown a dynamoelectric machine magnetic core assembly 1 that comprises a stack 2 of generally flat, conventionally insulated metal laminations arranged in face-to-face relationship in a well-known manner to define a rotor-receiving bore through the central portion of the stack. First and second clamping annuli 3 and 4 are positioned respectively at the opposite ends of the laminated stack 2. To afford the objectives of the invention, the inner radial portion of each annulus 3 and 4 is positioned over the stack 2 while the outer radial portion of the annuli 3 and 4 extend radially outward from the stack 2, as shown in FIG. 1. A plurality of elongated steel bars, several of which are identified by the numbers 5 thru 9, are positioned at substantially equally spaced-apart points around the periphery of the stack 2 to hold the annuli 3 and 4 in a pre-determined position in a manner that will be described in greater detail below. Each of the bars, 5–9 etc., has its respective ends welded to the respective radially outwardly extending portions 3b and 4b of the sides of the annuli facing the ends of the stack 2.

As is well-known in the dynamoelectric machine field, a plurality of pre-formed copper coils 10 are mounted in elongated axial slots (not shown) formed at equally spaced-apart points around the inner circumference of the stacked laminations of the stator to form an energizing winding. It will be understood that the core assembly 1 will be inserted completely within the supporting frame 11 when the machine is assembled in its operating position. In general, any suitable supporting frame may be used with a magnetic core assembly constructed pursuant to the invention; however, it is important to note that any such frame need only incorporate a relatively small area of accurately machined surfaces in order to receive the core assembly 1 therein, due to the advantageous feature of the present invention. Thus, it should be noted in FIG. 1 that the frame 11 includes a first set of machined surfaces 12, 12a, 12b and 12c which, in combination with a second set of machined surfaces 13, 13a, 13b and 13c are formed to receive precisely therein the outer peripheral surfaces of machined clamping annuli 3 and 4 on the core assembly 1. As the description of the instant invention proceeds, it will become clear that such a novel and advantageous mounting arrangement for the core assembly 1 is made possible by use of an accurate positioning means for locating and retaining the clamping annuli 3 and 4 in desired pre-determined position relative to the inner diameter of the stator laminations, which comprise one side of the air gap of the finished machine. Accordingly, it will be seen that one advantage of the present invention is that only relatively limited portions of the supporting frame need be machined to accept the core assembly 1 rather than requiring the entire axial length of the frame 11 to be machined, as was common practice in prior art dynamoelectric machine manufacturing methods.

It should be understood that the frame 11, as shown in FIG. 1, may be completed by mounting conventional cover plate over the outer surface thereof. Also, those skilled in the art will recognize that various alternative configurations may be used to form the frame 11 and of course, any suitable structural material, such as steel, may be used to form it and other stator clamping components of the invention thus far described.

As noted above, one of the characteristic features of the core assembly 1 is that the lamination-clamping annuli 3 and 4 are dished, or pre-stressed axially outward at their inner diameters. A unique manufacturing method utilizing novel tooling is employed to obtain this unique pre-stressed, resiliently biased arrangement of the clamping flange annuli 3 and 4. Reference may now be made to FIG. 2 of the drawings in which there is depicted one preferred form of the novel stepped ring tools that are used in practicing the method of the invention. To facilitate understanding of the invention, like numerals are used to identify equivalent parts in all FIGURES of the drawings used in the description. Accordingly, it will be seen that in FIG. 2 there is shown in cross-section the stator core stack 2 of generally flat, insulated steel laminations that comprise the central portion of the core assembly 1 illustrated in FIG. 1. Likewise, the clamping annuli 3 and 4 are positioned at opposite ends of the stack 2 with their respective inner portions 3a and 4a over the stack 2 while their outer portions 3c and 4c are disposed radially outward from the stack. Two of the elongated ribs 6 and 6' which secure the annuli 3 and 4 in desired spaced-apart relationship, are also illustrated.

In order to apply a desired given optimum compressive force to the stack 2 of the laminations, without requiring the use of extra massive means to obtain such a force, or retain it in the stack, a pair of stepped rings 14 and 15 (also see FIG. 3) are provided and accurately positioned relative to the stack 2 so that their respective inner diameters are in alignment with the inner diameter 2' of the laminations defining the rotor-receiving bore through the stack 2. As will be understood by those skilled in the art, the inner diameter 2' of each of the laminations is accurately positioned in alignment on a mandrel 16, which, in the embodiment of the invention shown, is mounted on a rotary steel table 17.

The detailed features of the stepped rings 14 and 15 will now be described with particular reference to FIG. 3 of the drawing. Each of the rings 14 and 15 may be substantially identical in configuration, therefore, only the features of ring 14 will be discussed in detail. As seen in FIG. 3, ring 14 is provided with a base surface portion 14a and first and second annular step 14b and 14c, which are disposed radially outward from the base portion 14a with the lands of the step facing the associated annulus 3. As is conventional in the manufacture of large dynamoelectric machines, a pair of annular spacer blocks 18 and 19 are mounted respectively between the stack 3 and clamping annuli 3 and 4 to help distribute the compressive force of the annuli to the inner diameter of the stator teeth of the stacked laminations 2.

Referring again to both FIGS. 2 and 3 of the drawings, it will be seen that in practicing the method of the invention, the outer periphery of each annulus 3 and 4 is positioned against the rise of the second steps 14c and 15c, thereby to also position the radially outer surfaces of each annulus on the lands of the first steps 14b and 15b of the rings juxtaposed therewith. This arrangement of the stepped rings 14 and 15, with their innermost diameters positioned against the mandrel 16, serves to quickly and accurately position the outer machined peripheries of the clamping annuli 3 and 4 in order to accurately space the inner diameter 2' of the laminations relative to the frame 11, as explained above.

The next step in the manufacturing method of the invention is to apply and hold an axial compression force on the axially outer surfaces of the rings 14 and 15 as shown in FIG. 2. This force may be applied by a conventional hydraulic press, such as the press 20 shown schematically in FIG. 2, or by any suitable alternative pressing means. In order to localize the pressure applied by the press 20 to a desired portion of the stepped rings 14 and 15, a selected one of a number of different sized rings such as the rings 21 and 22 may be employed. As shown, rings 21 and 22 are positioned essentially over the first step 14b and 15b of the stepped rings 14 and 15. In practicing the preferred method of the invention, a smaller diameter ring (not shown) than ring 21 would be placed adjacent mandrel 16 as the laminations of stack 2 are pressed into position. In this manner, maximum pressure is applied near the inner edges of the laminations. Finally, after the components are arranged, as shown in FIG. 2, with all the laminations and a relatively large diameter ring 21 in place, the press 20 is actuated to compress the stack 2 of laminations and deflect the respective inner portions 3a and 4a of the annuli 3 and 4 axially outward into the spaces defined by the rises of the first step 14b and 15b and the respective base portions 14a and 15a of the rings 14 and 15 abutting the respective annuli. Typically, in relatively large dynamoelectric machines, the compressive force applied by the press 20 may be in the neighborhood of 40 to 150 tons.

After the stack 2 has thus been compressed under a desired given pressure, the elongated ribs or bars 6–9 and 6', etc., are positioned at accurately spaced points between the annuli 3 and 4 with the longitudinal axes of the bars substantially parallel to the longitudinal axis of the stack 2. An important feature of the present invention is that the lengths of each of these bars is a predetermined distance shorter than the distance between the axially inner surfaces of the annuli 3 and 4 adjacent the outer periphery thereof when the desired given axial compressive force is held on the stepped rings 14 and 15 by press 20. In particular, it has been found that this desired pre-determined distance or positive clearance should be in the range of 5 to 60 mils to yield the most preferred results in practicing the invention.

After the elongated bars are thus positioned around the periphery of stack 2, the respective ends of each bar are welded to the adjacent annuli 3 and 4 thereby to rigidly fix the spacing the outer portions 3b and 4b of the annuli. Finally, the axial compressive force applied by press 20 is released and the stepped rings 14 and 15 are removed from contact with the annuli 3 and 4. It should be understood that by constructing a core assembly 1 pursuant to the unique method just described, the clamping annuli 3 and 4 will be resiliently prestressed or dished axially outward at their inner diameters while the pressure from press 20 is applied, consequently, after the elongated bars have been welded to the annuli and the pressure of press 20 is released, a desired resilient compressive force will be maintained on the ends of stack 2 by the tendency of the annuli 3 and 4 to return to their original generally flat configuration. This resilient biasing force prevents the compressed force in stack 2 from expanding the stack axially as frequently occurs when one of the more conventional, static type clamping systems are utilized due to the take-up in such a system caused by the latent force in the compressed stack 2.

In the preferred form of the invention, the elongated bars or ribs are welded to the annuli 3 and 4 in a certain manner and sequence to afford optimum pre-stressing of the annuli. It will be understood that each of the elongated bars are welded in substantially the same manner, accordingly, only the welding on bar 6' shown in FIG. 3 will be described in detail.

In the most preferred form of the invention after the press 20 is moved to apply a desired pre-determined compressive force to the stack of laminations 2, and the elongated bar 6' is mounted between the annuli 3 and 4 so that it abuts the annuli 4 and is spaced between 5 and 60 mils distance from the annuli 3, a tack weld is formed between the bar 6' and the adjacent annuli 3 and 4 at points adjacent the stack 2. Then, continuous welds 30 and 31 shown in FIG. 3 are formed starting at the periphery of the annuli and continuing inward to the tack welds 28 and 29.

After the bar 6' has been welded in that manner, a preferred sequence of welding is performed to attach the remaining bars to the annuli 3 and 4. In this preferred sequence, the next bar to be welded is diametrically opposite to the bar 6', i.e., bar 6 would be welded next. Then, the two bars spaced from the closest welded bar by approximately 90° would be welded to the annuli. As the welding sequence is continued, a second set of four elongated bars would be welded to the annuli and each of the bars in the second set would be spaced from each other by approximately 90° and be about equally spaced from the two closest bars of the first set of four bars that were welded to the annuli. This preferred sequence and method of welding the bars by forming a continuous weld from the periphery thereof toward the stack 2 causes the strongest part of the weld thus formed to be positioned adjacent the stack 2 where a maximum moment will be applied to it by the pre-stressed biasing force applied to the annuli 3 and 4 when press 20 is forced downward to move the stepped rings 14 and 15 together. Preferably, both sides of each bar are welded to the annuli 3 and 4 along substantially the complete radial extent of the bars.

It has been found that while the foregoing sequence and desired direction of one of the welds, such as welds 30 and 31 is most desirable, in some applications of the invention, a suitable holding force can be provided between the elongated bars and the annuli 3 and 4 if the welds 30 and 30' are started adjacent the stack 2 and continued outwardly to the periphery of the annuli 3 and 4 where they are puddled and terminated. It should also be noted that in the preferred embodiment of the invention, the radial width of each of the lands of the first step 14b and 15b on the stepped rings 14 and 15 is less than one-half the radially extending dimension of the elongated bars 6–9 and 6', et cetera. Such dimensions allow the annuli to be dished outward with the lowest practical amount of compressive force being required from the press 20. Of course, other dimensions of the step 14b and 14c in the step rings 14 and 15 may be employed in other embodiments of the invention. It has also been found that it is preferable to have the radially extending width of each of the elongated bars about 4 inches wide, but they should be at least 2 inches wide. Such a substantial dimension enables the welds 30, 31, etc., when applied in the above-noted desirable sequence and method of formation, to retain the desired pre-determined spacing of the outer portion 3b and 4b of annuli 3 and 4, without requiring massive welds or the build-up several weld beads to prevent the joint from being ruptured when the inner portions 3a and 4a are dished axially outward.

Thus, the pre-stressing of annuli 3 and 4 described above, pursuant to the method of the invention, serves to reduce the expense and manufacturing complexity of securing the bars 6, 6', etc., to the annuli.

Finally, it will be appreciated that all of the elongated bars may be mounted respectively in pre-formed longitudinal slots, such as the slot 2a formed in the stack 2 to receive the bar 6', shown in FIG. 3. Of course, the welds 30 and 31 extending along the sides of the bar, such as bar 6', would not extend into the slot 2a or similar slots.

Those skilled in the art will recognize that various modifications and alternative forms of the invention may be practiced from the description of it that is provided herein. Accordingly, it is our intention to encompass the true spirit and scope of the invention within the bounds of the following claims.

What we claim as new and desire to secure by Letter Patent of the United States is:

1. A dynamoelectric machine magnetic core assembly comprising, a stack of generally flat, insulated metal laminations arranged in face-to-face relationship to define a rotor-receiving bore, first and second clamping annuli positioned respectively at the opposite ends of said stack of laminations with an inner portion of each annulus extending radially outward from the stack, a first and a second annular spacer block disposed, respectively, between one clamping annulus and one end of the stack of laminations, a plurality of elongated bars having their respective ends welded to the respective radially outwardly extending portions of the sides of said annuli facing the ends of said stack, at least one of said annuli being formed with said inner portion thereof deflected axially outward with respect to said outer portion thereof, each of said bars being substantially equal in length and in the range of 4 to 60 mils shorter than the combined axial length of the stack of laminations and said shorter spacer blocks, thereby to cause the clamping annuli to apply a continuous compressive force on the stack of laminations.

2. An invention as defined in claim 1 wherein both of said annuli are formed to position the respective inner portions thereof axially outward from said outer portions thereof.

3. An invention as defined in claim 2 wherein the radially inner side of at least one of said bars is disposed in a longitudinal slot formed in the outer surface of said stack of laminations.

4. An invention as defined in claim 3 wherein the welds securing each of said bars to the annuli extend substantially the full radially extending length of at least one side of the juxtaposed surfaces of said bars except for the portion thereof disposed in said longitudinal slot.

5. An invention as defined in claim 4 wherein both radially extending sides of said bars are welded to said annuli.

6. An invention as defined in claim 4 wherein the radially extending width of each of said bars is at least 2 inches.

* * * * *